United States Patent
Fukaya et al.

(10) Patent No.: US 6,558,117 B1
(45) Date of Patent: May 6, 2003

(54) VARIABLE DISPLACEMENT TURBO SUPERCHARGER

(75) Inventors: Masashi Fukaya, Tsuchiura (JP); Yasunori Murakami, Hitachinaka (JP); Tetsuo Udagawa, Hitachinaka (JP); Tsutomu Okazaki, Hitachinaka (JP)

(73) Assignees: Hitachi, Ltd., Tokyo (JP); Hitachi Car Engineering Co., Ltd., Hitachinaka (JP)

(*) Notice: Subject to any disclaimer, the term of this patent is extended or adjusted under 35 U.S.C. 154(b) by 0 days.

(21) Appl. No.: 09/623,199

(22) PCT Filed: May 18, 2000

(86) PCT No.: PCT/JP00/03198

§ 371 (c)(1),
(2), (4) Date: Dec. 27, 2001

(87) PCT Pub. No.: WO00/71873

PCT Pub. Date: Nov. 30, 2000

(30) Foreign Application Priority Data

May 20, 1999 (JP) .......................................... 11-139668

(51) Int. Cl.[7] ............................................... F01B 25/02
(52) U.S. Cl. ........................ 415/164; 415/160; 415/191; 415/208.2
(58) Field of Search .................. 415/164, 200, 415/160, 162, 163, 191, 208.2

(56) References Cited

U.S. PATENT DOCUMENTS

| | | | | |
|---|---|---|---|---|
| 4,643,640 A | * | 2/1987 | Burdette et al. | 415/164 |
| 4,654,941 A | * | 4/1987 | Burdette et al. | 29/156.8 R |
| 4,659,295 A | * | 4/1987 | Burdette et al. | 417/407 |
| 4,702,672 A | * | 10/1987 | Leicht et al. | 415/164 |
| 4,804,316 A | * | 2/1989 | Fleury | 417/407 |
| 5,146,752 A | * | 9/1992 | Bruestle | 60/602 |

FOREIGN PATENT DOCUMENTS

| | | |
|---|---|---|
| JP | 7197209 | 8/1995 |
| JP | 10103070 | 4/1998 |

* cited by examiner

Primary Examiner—Edward K. Look
Assistant Examiner—James M McAleenan
(74) Attorney, Agent, or Firm—Antonelli, Terry, Stout & Kraus, LLP

(57) ABSTRACT

A variable geometry turbocharger in which a bill-like projection portion is arranged in a part of an outer periphery of a flow passage spacer, and the projection portion is protruded to a turbine rotor side at a predetermined angle or the projection portion is movably provided. Alternatively, a rod-like member is arranged in a part of an outer periphery of a flow passage spacer and the rod-like member is arranged so as to be adjacent to the turbine rotor side at a predetermined angle. Alternatively, a guide vane in which a leading edge side of a rotational shaft is eliminated is arranged in a part of an outer periphery of a flow passage spacer and the rotational shaft is arranged so as to be adjacent to the turbine rotor side at a predetermined angle. Further, a heat resisting cast steel having a little amount of carbon is employed as a material for a casing and a guide vane table sectioning the turbine chamber, and without using the flow passage spacer and in place of the flow passage spacer, both side walls sectioning the turbine chamber themselves keep a gap with respect to the guide vane minimum. Accordingly, a high turbine efficiency can be obtained by preventing a gas stream from being separated at the back of a flow passage spacer and inside a guide vane, since a hydraulic energy loss is reduced and a uniform and high average flow speed distribution is realized at a position of an inlet of a turbine rotor.

18 Claims, 15 Drawing Sheets

(STREAM OF GAS)

VARIABLE DISPLACEMENT TURBO SUPERCHARGER

FIELD OF THE INVENTION

The present invention relates to a variable geometry turbocharger in which rotatable guide vanes surrounding a turbine rotor are arranged within a turbine chamber and a keeping function for keeping a gap between both side walls sectioning the turbine chamber and the guide vanes is provided.

BACKGROUND ART

In a turbine of a conventional variable geometry turbocharger, in order to prevent a stick of the guide vanes (that is, the phenomenon that the guide vanes do not move) due to a thermal deformation of both of the side walls sectioning the turbine chamber, it is necessary to provide a gap between both of the side walls and the guide vanes, so that there is a problem that an efficiency of the turbine is reduced when the gap is increased.

In Japanese Patent Examined Publication No. 7-13468, there is shown an embodiment of a variable turbine nozzle provided with rod-like flow passage spacers, in which the flow passage spacers are arranged in an outer edge portion of a whole of the vanes in a radial direction and the axial length of the flow passage spacer is set to be slightly longer than the axial length of the vane. Further, one of the flow passage spacers is preferably press fitted into and fixed within a hole portion provided in a nozzle ring. At least three additional flow passage spacers are arranged so as to be apart from each other with a uniform interval and have a predetermined space between the nozzle ring and an inner wall.

Further, in Japanese Patent Unexamined Publication No. 2-196131, the structure is made such that guide vanes are arranged within a turbine chamber of a turbocharger so as to surround a turbine rotor, at least one of the guide vanes is fixed between both of the side walls of the turbine chamber and a blade angle of the other guide vanes can be adjusted. In accordance with the structure mentioned above, it is possible to keep a gap between both of the side walls of the turbine chamber and the movable guide vane minimum and it is possible to keep a high turbine efficiency.

However, in the case of employing the rod-like flow passage spacer described in the Japanese Patent Examined Publication No. 7-13468, a separation area is formed at the back of each of the flow passage spacers with respect to a stream of gas and a hydraulic energy loss is generated. Further, the separation area extends downstream as a wake so as to reduce an average flow speed at a position of an inlet of the turbine rotor and generate an uneven flow speed distribution in a peripheral direction, whereby a reduction of the turbine efficiency is caused. Further, due to some rotational angles of the guide vane, a stream between the flow passage spacer and the guide vane does not move along the guide vane and there is generated a state that the separation area is formed inside the guide vane. At this time, the wake from the guide vane involving the separation area increases its length downstream, whereby the turbine efficiency is further reduced.

Further, the Japanese Patent Unexamined Publication No. 2-196131 does not refer to the gas stream and does not describe a shape and a size of the guide vane with taking the separation area into consideration.

DISCLOSURE OF THE INVENTION

An object of the present invention is to provide a variable geometry turbocharger which can achieve a high turbine efficiency by preventing a gas stream from being separated at the back of a flow passage spacer and inside a guide vane so as to reduce a hydraulic energy loss and realize a uniform and high average flow speed distribution at a position of an inlet of a turbine rotor.

In accordance with the present invention, a bill-like projection portion is arranged in a part of an outer periphery of a flow passage spacer, and the projection portion is protruded to a turbine rotor side at a predetermined angle or the projection portion is movably provided. Alternatively, a rod-like member is arranged in a part of an outer periphery of a flow passage spacer and the rod-like member is arranged so as to be adjacent to the turbine rotor side at a predetermined angle. Alternatively, a guide vane in which the leading edge side of the rotational shaft is eliminated is arranged in a part of an outer periphery of a flow passage spacer and the rotational shaft is arranged so as to be adjacent to the turbine rotor side at a predetermined angle. Accordingly, the gas stream is prevented from being separated at the back of the flow passage spacer and inside the guide vane, and a high turbine efficiency can be obtained.

Further, a heat resisting cast steel having a little carbon content is employed as a material for a casing sectioning the turbine chamber and a guide vane table. In place of the flow passage spacer, a casing wall and the wall of the guide vane table themselves keep a gap with respect to the guide vane minimum. Accordingly, it is possible to prevent the gas separation from being generated due to the flow passage spacer, and a high turbine efficiency can be obtained.

BEST MODE FOR CARRYING OUT THE INVENTION

In order to describe the present invention in more detail, the present invention will be described with reference to the accompanying drawings.

Figure 1:
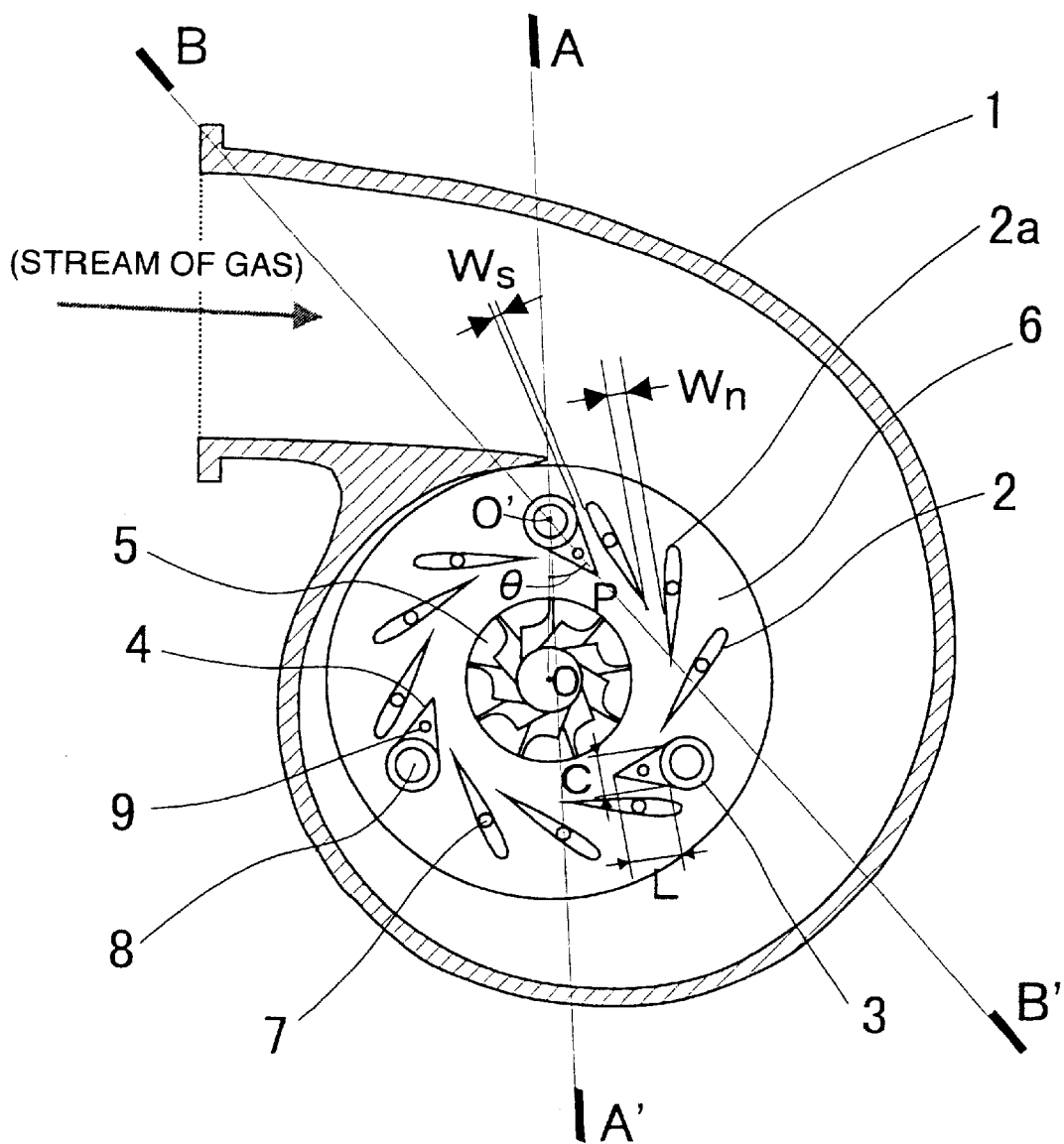
FIG. 1 is a cross sectional view of a turbine portion of a variable geometry turbocharger in accordance with a first embodiment of the present invention.

FIG. 1 shows a first embodiment of a turbine portion of a variable geometry turbocharger in accordance with the present invention.

The turbine portion is constituted of a casing 1, rotatable guide vanes 2 arranged within the casing 1, a flow passage spacer 3 having a cylindrical figuration and arranged between pitches of guide vanes 2, a bill-like projection portion 4 positioned in a part of an outer periphery of the flow passage spacer 3, and a turbine rotor 5 positioned inside the guide vanes 2, the flow passage spacer 3 and the bill-like projection portion 4. The bill-like projection portion 4 is arranged so as to protrude a projection portion thereof to a side of the turbine rotor 5 at a predetermined angle θ=45 degrees. In this case, an angle θ is defined by a magnitude of an angle OO'P formed by an axial center O of the turbine rotor 5, a center O' of the flow passage spacer 3 and a projection edge point P of the bill-like projection portion 4. When the angle θ is within a range between 15 degrees and 75 degrees, it is possible to prevent the separation from being generated, however, the angle θ is preferably set to about 45 degrees.

Each of the guide vanes 2 is supported by a rotational shaft 7 extending outward of a guide vane table 6, and is rotated together with the rotational shaft 7 by an external drive mechanism (not shown). In the present embodiment, an outer diameter of the turbine rotor 5 is about 40 mm, and a distance between an axial center of the rotational shaft 7 of the guide vane 2 and an axial center O of the turbine rotor 5 is about 35 mm. Further, a distance between a center O' of the flow passage spacer 3 and the axial center O of the turbine rotor 5 is about 38 mm.

A chord length of the guide vane 2 is about 20 mm and a maximum vane thickness is about 3 mm. Taking a stress due to a thermal deformation of the casing 1 and the guide vane table 6 into consideration, an outer diameter of the flow passage spacer 3 is set to about 9 mm. Further, a width C and a length L of the bill-like projection portion 4 are substantially the same as the outer diameter of the flow passage spacer 3. The number of the flow passage spacer 3 is three and the flow passage spacers 3 are placed at positions uniformly separating the periphery into three portions in a peripheral direction. Each three of nine guide vanes 2 are periodically symmetrically arranged, and the guide vanes 2 are arranged in an uneven pitch on the whole.

Figure 2:
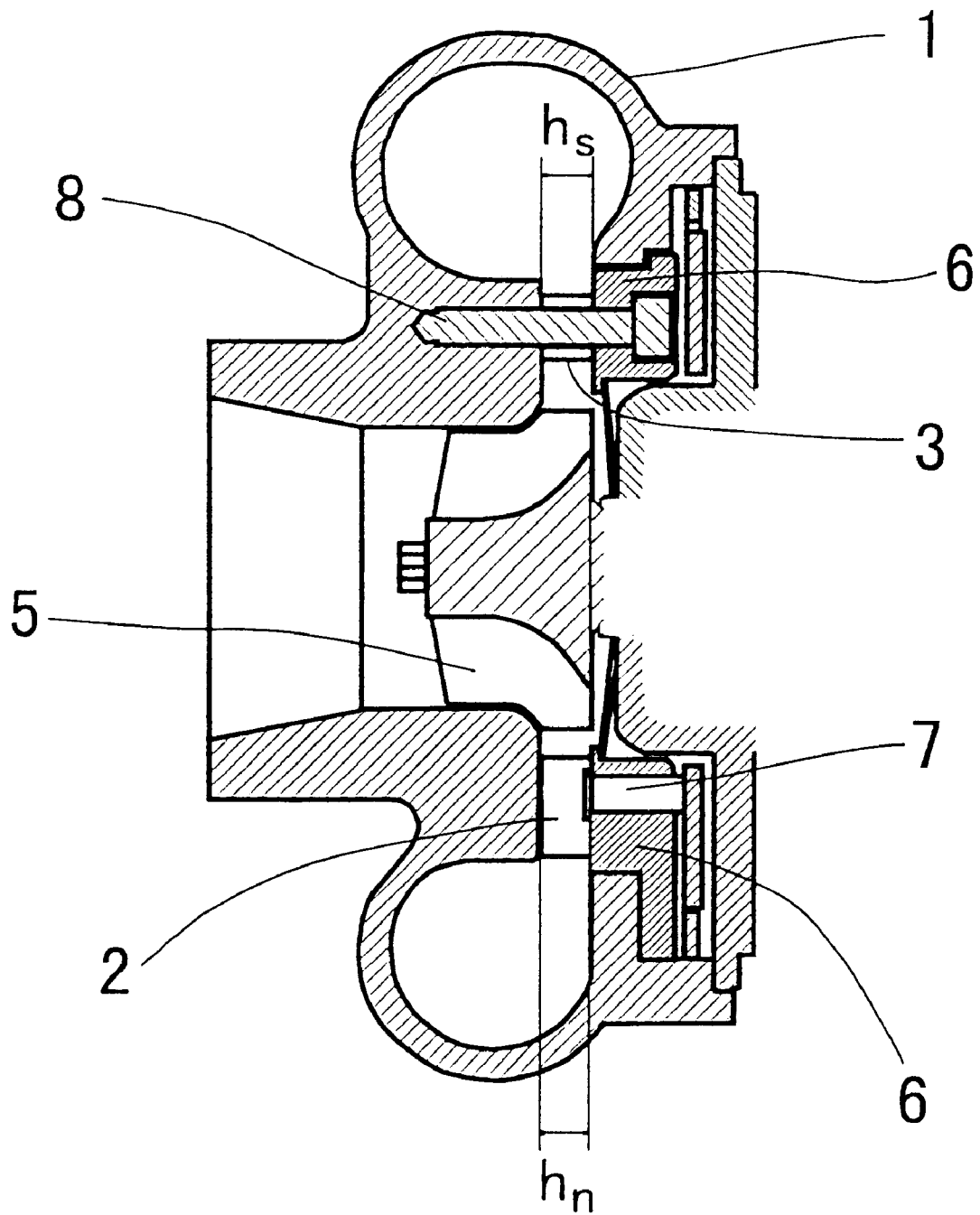
FIG. 2 is a cross sectional view taken along a line A–A' of the turbine portion in FIG. 1.

FIG. 2 shows a cross section taken along a line A–A' in FIG. 1. A bolt 8 extends through the guide vane table 6 and the flow passage spacer 3, and is fastened to the casing 1. A material having the same coefficient of linear expansion as that of the guide vanes 2 (for example, SCH22 (JIS standard)) is employed for a material of the flow passage spacer 3 and the bolt 8. A width hs of the flow passage spacer 3 is designed to be slightly larger than a width hn of the guide vanes 2, whereby a gap between both of the side walls of the casing 1 and the guide vane table 6 sectioning the turbine chamber, and the guide vanes 2 can be kept minimum.

Figure 3:
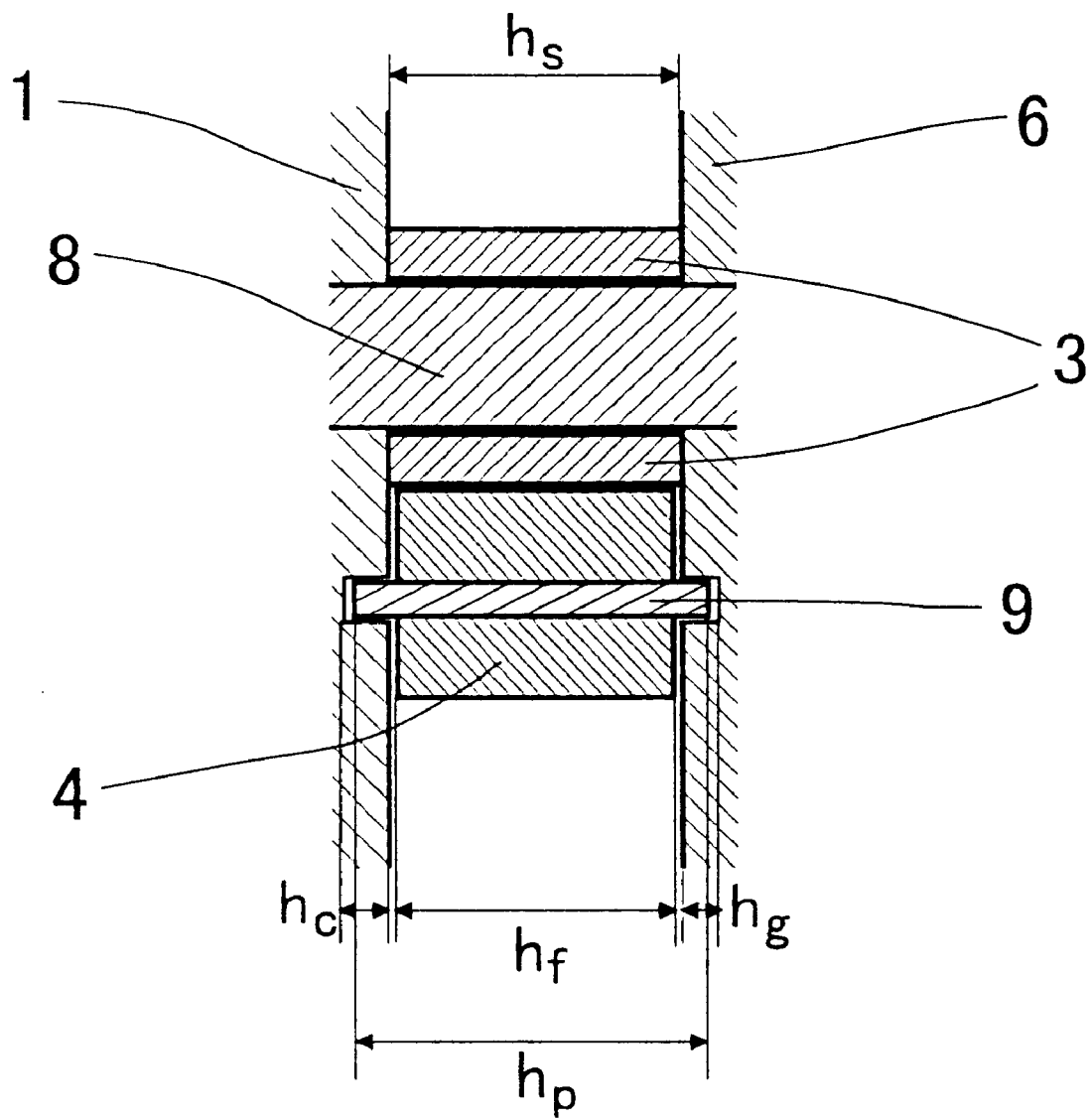
FIG. 3 is a view which shows a periphery of a flow passage spacer in a cross section taken along a line B–B' in FIG. 1.

FIG. 3 shows a periphery of the flow passage spacer 3 in a cross section taken along a line B–B' in FIG. 1. Holes respectively having depths hc and hg are provided in the side walls of the casing 1 and the guide vane table 6. A cylindrical pin 9 passes through the bill-like projection portion 4, and both end portions thereof are inserted into the respective holes. Accordingly, the bill-like projection portion 4 is fixed within the turbine chamber, and the angle θ mentioned above is determined in accordance with a position of the pin 9. A width hf of the bill-like projection portion 4 is smaller than the width hs of the flow passage spacer 3 and is substantially equal to the width hn of the guide vanes 2. Further, a length hp of the pin 9 is larger than the width hs of the flow passage spacer 3 and is smaller than a width (hs+hc+hg).

Only the pin 9 supports the bill-like projection portion 4, however, a part of the bill-like projection portion 4 is structured such as to be closely attached along a cylindrical figuration of the flow passage spacer 3 as shown in FIG. 1, so that the bill-like projection portion 4 does not widely swing around the pin 9. In this case, the bill-like projection portion 4 may be supported by utilizing any one of the side wall of the casing 1 and the side wall of the guide vane table 6. Further, in place of the pin 9, the bill-like projection portion 4 may be supported by screws or welding.

In FIG. 1, gas introduced from an inlet of the casing 1 is introduced to the turbine rotor 5 via a flow passage formed between the guide vanes 2 or between the guide vane 2 and the flow passage spacer 3. It is possible to simultaneously reduce a flow passage width Wn between the guide vanes 2 and a flow passage width Ws between the guide vane 2 and the flow passage spacer 3 by changing a rotational angle of the guide vane 2, and it is possible to increase a speed of the gas so as to flow the gas into the turbine rotor 5. Accordingly, since the number of rotation of the turbine rotor 5 can be increased and a compressor impeller (not shown) being concentric with the turbine rotor 5 is also rotated at a high speed, a turbocharging effect can be obtained.

Figure 4:
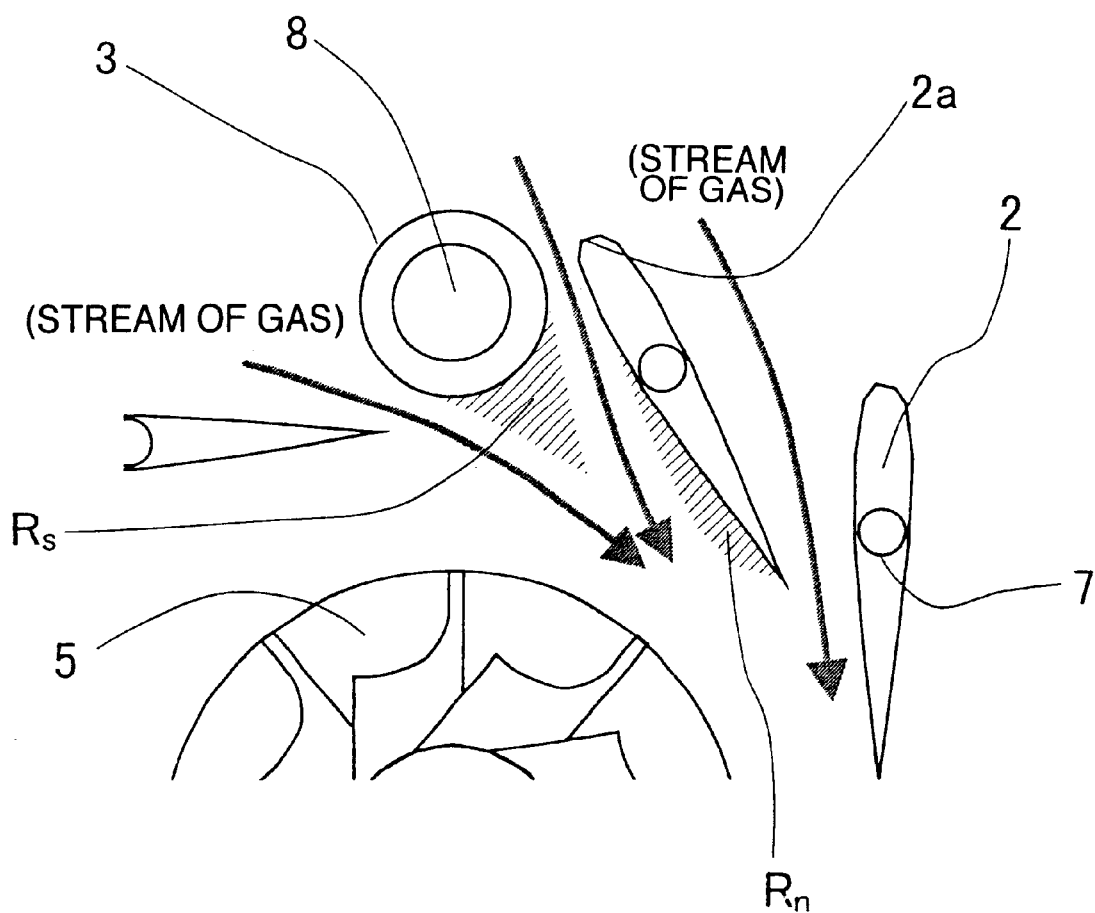
FIG. 4 is a view which shows a gas flow in a periphery of a flow passage spacer and a guide vane in accordance with a conventional embodiment employing no bill-like projection portion.
Figure 5:
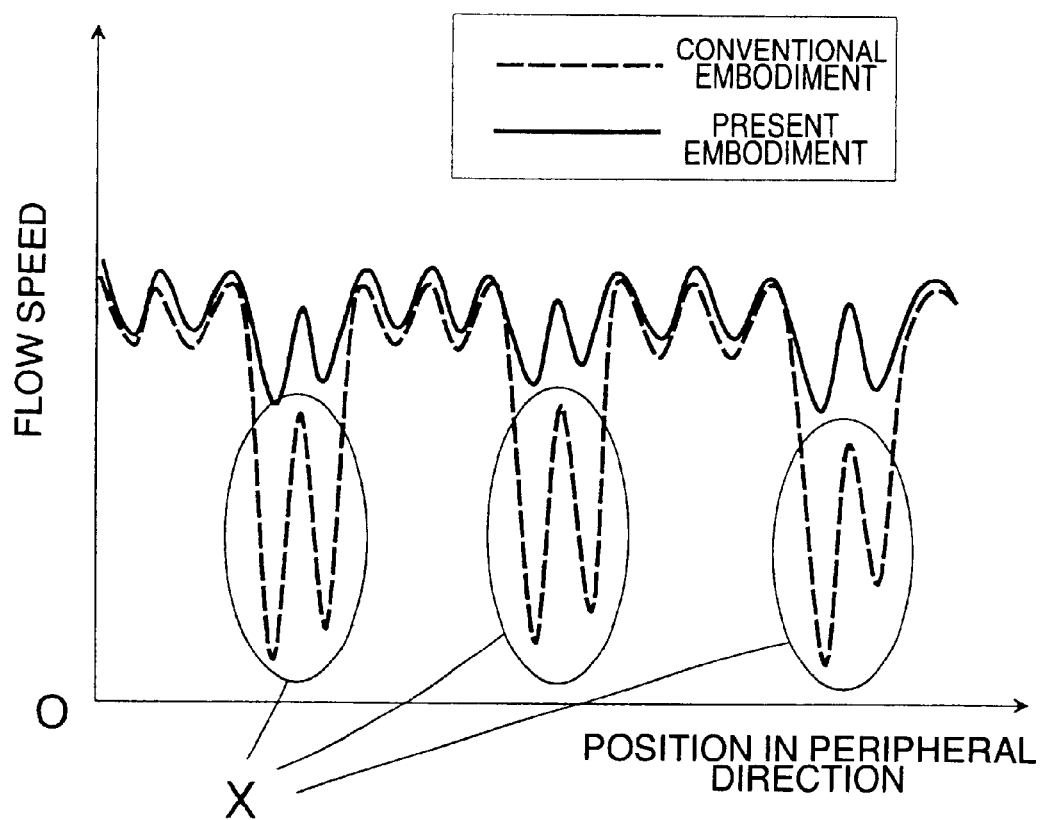
FIG. 5 is a view which shows a difference of a flow speed distribution in a peripheral direction at a position of an inlet of a turbine rotor in accordance with the conventional embodiment and the present embodiment in the invention.

In accordance with the present invention, the bill-like projection portion 4 is arranged in a part of the outer periphery of the flow passage spacer 3 having a cylindrical figuration, however, in the conventional case which does not employ this structure, as shown in FIG. 4, a separation area Rs is formed at the back of the flow passage spacer 3 with respect to the stream of the gas supplied from the inlet of the casing 1. Further, in a state that a leading edge 2a of the guide vane comes near the flow passage spacer 3 as shown in FIG. 4, the stream between the flow passage spacer 3 and the guide vane 2 does not flow along the guide vane 2 and a separation area Rn is also formed inside the guide vane 2. A hydraulic energy loss due to the separation of the stream mentioned above causes a reduction of the turbine efficiency. Further, a wake having a low flow speed long extends downstream from the separation area generated around the flow passage spacer 3 or the guide vane 2. Accordingly, as shown in FIG. 5, a flow speed distribution in a peripheral direction at an inlet position of the turbine rotor 5 becomes an uneven distribution having a peak X of a low flow speed.

Accordingly, the loss in the turbine rotor 5 is increased, and a high turbine efficiency can not be obtained.

Figure 6:
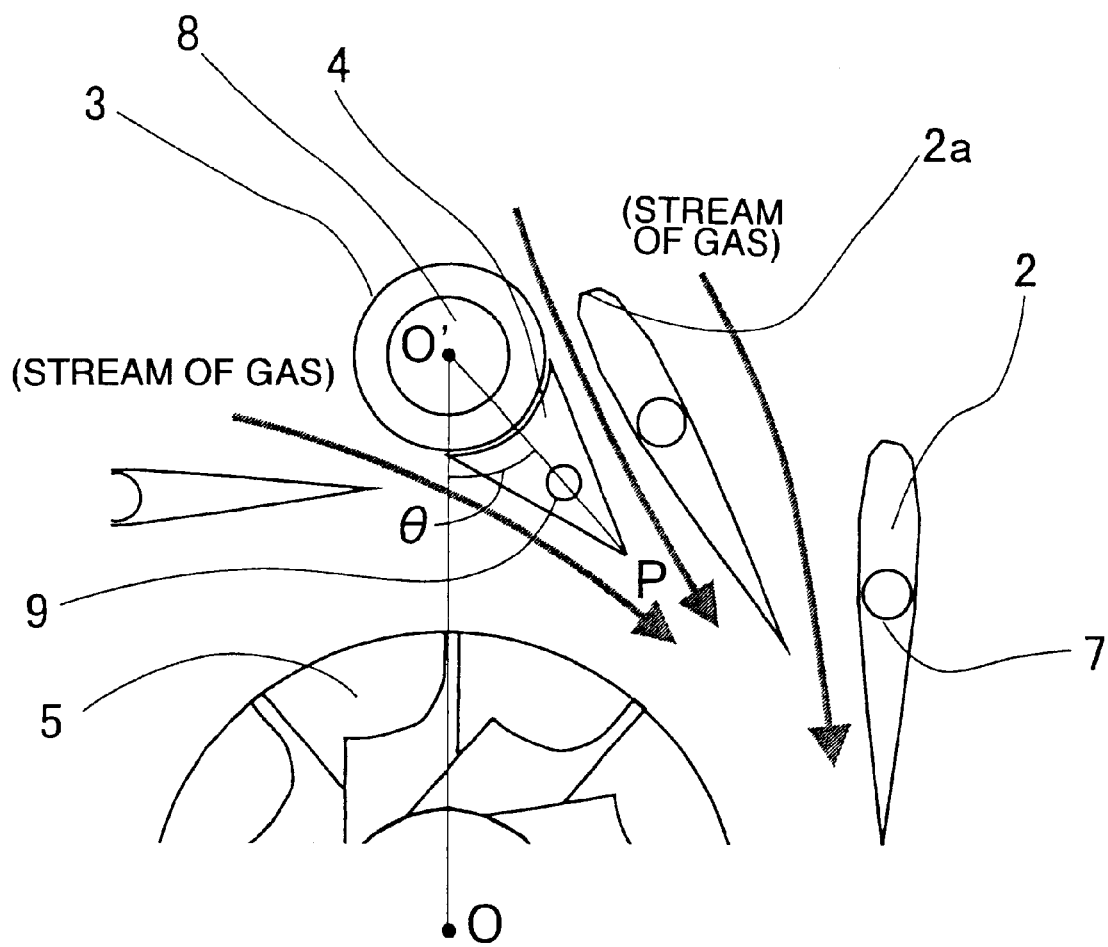
FIG. 6 is a view which shows a gas stream in a periphery of a flow passage spacer and a guide vane in accordance with the first embodiment of the present invention.

FIG. 6 shows a state of the stream of the gas in the periphery of the flow passage spacer 3 and the guide vane 2 in accordance with the present embodiment. In the present embodiment, it is possible to prevent the separation area from being generated at the back of the flow passage spacer 3 by providing the bill-like projection portion 4. Further, even in the state that the leading edge 2a of the guide vane comes close to the flow passage spacer 3, the bill-like projection portion 4 presses the stream between the flow passage spacer 3 and the guide vane 2 to the guide vane 2 side, and the stream moves along the inner side of the guide vane 2, the separation area is not formed. Accordingly, it is possible to prevent the hydraulic energy loss from being generated due to the separation of the stream. Further, since the separation area is not generated, the length of the wake from the flow passage spacer 3 or the guide vane 2 can be shortened. As a result, the peak X of the low flow speed is reduced, and the flow speed distribution in the peripheral direction at the inlet position of the turbine rotor 5 becomes more uniform in comparison with the conventional one, as shown in FIG. 5, so that the loss in the turbine rotor 5 is reduced. Further, an average flow speed in the peripheral direction at the inlet position of the turbine rotor 5 is increased, whereby an amount of work performed by the stream of the gas in the turbine rotor 5 is increased.

Figure 7:
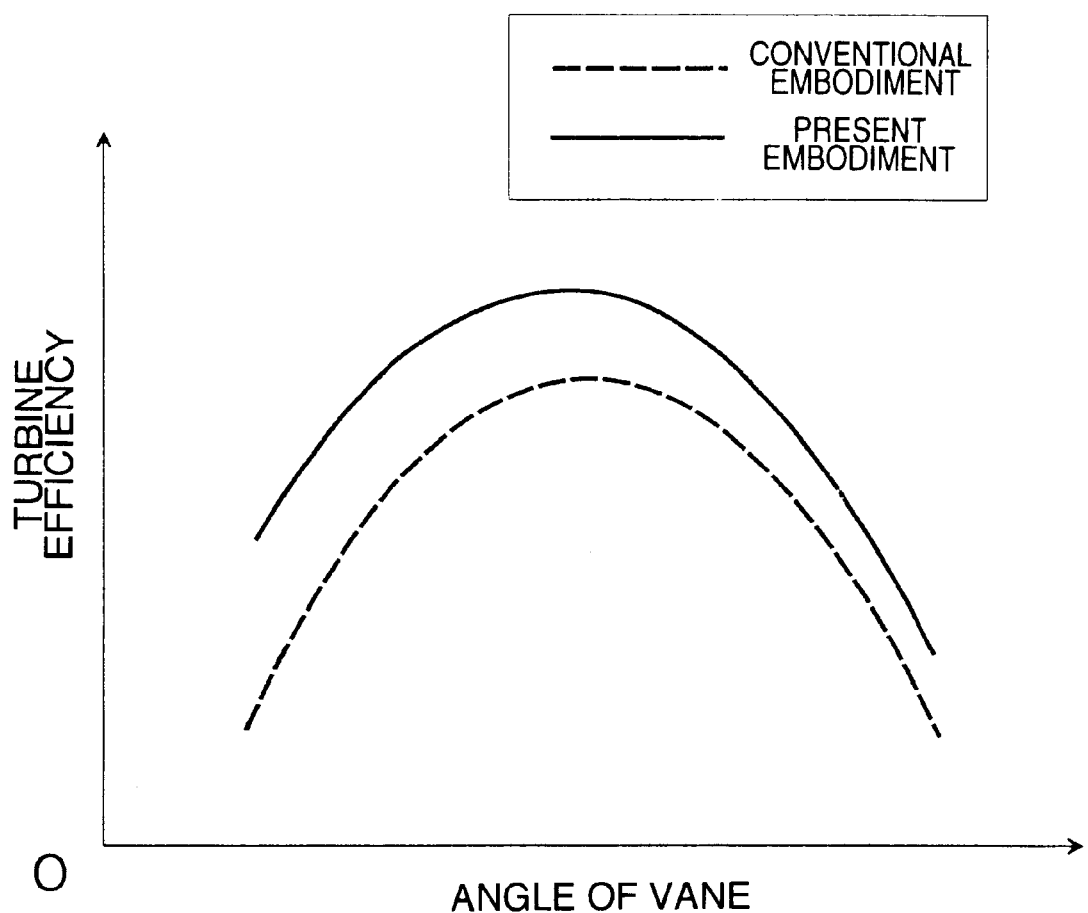
FIG. 7 is a view which shows a difference of a turbine efficiency in accordance with the conventional embodiment and the present embodiment in the invention.

In accordance with the structure of the present embodiment, as shown in FIG. 7, a higher turbine efficiency can be realized in the case that the bill-like projection portion 4 is provided, in comparison with the conventional case that the bill-like projection portion 4 is not provided. In this case, in accordance with the present embodiment, the bill-like projection portion 4 and the flow passage spacer 3 are constituted by independent parts, however, the same operations and effects can be obtained even by integrally forming the flow passage spacer 3 with the bill-like projection portion 4.

Figure 8:
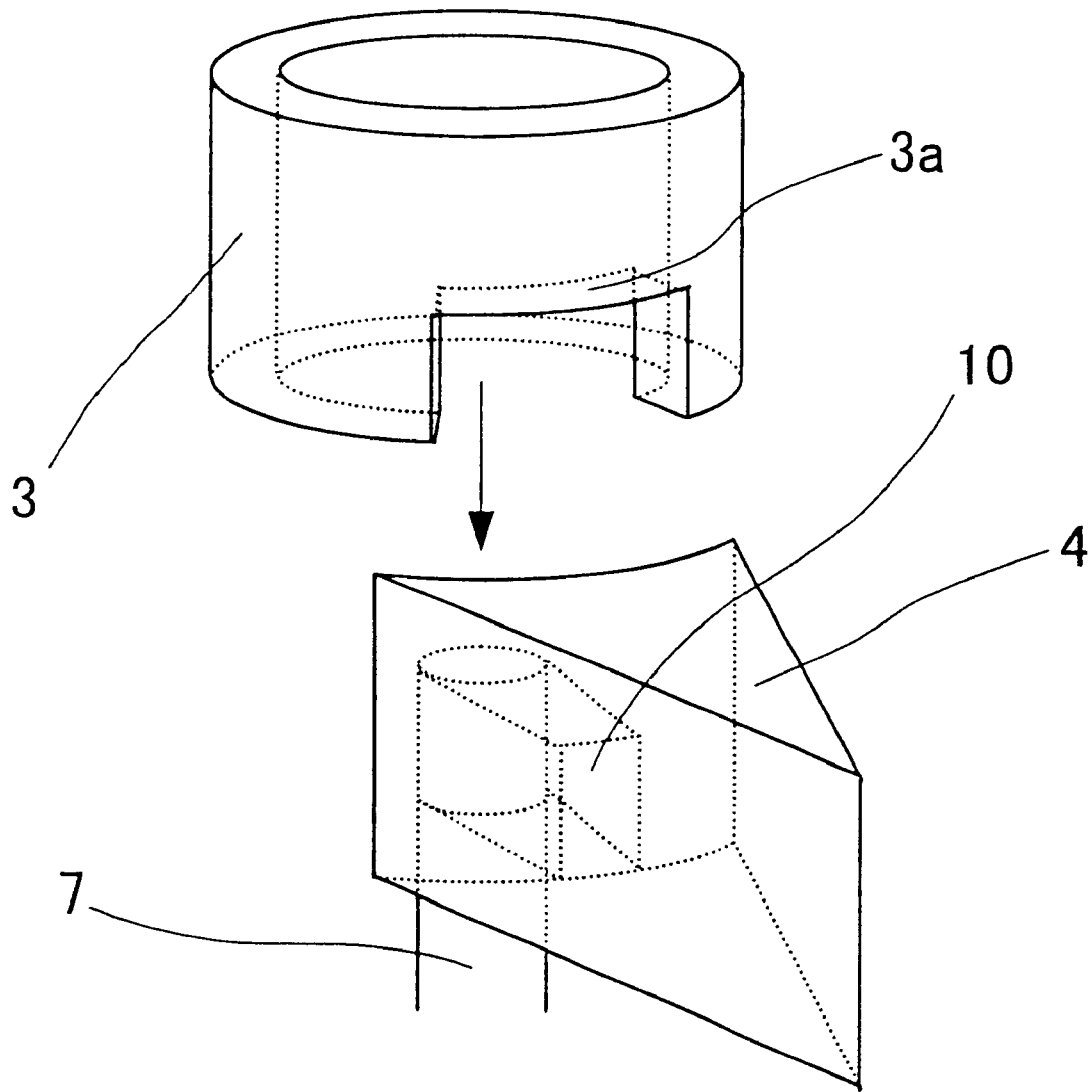
FIG. 8 is a perspective view which shows a structure in a periphery of a flow passage spacer and a bill-like projection portion in the case of making the bill-like projection portion movable.

Further, FIG. 8 shows an embodiment in which the bill-like projection portion 4 is movably provided. The bill-like projection portion 4 is bonded to the rotational shaft 7 via an arm 10 by welding or the like. The flow passage spacer 3 is fixed to the side wall of the casing 1 and the side wall of the guide vane table 6 by welding or the like without using the bolts 8. Further, a notch portion 3a is provided in a part of the cylindrical flow passage spacer 3. The rotational shaft 7 is arranged within the flow passage spacer 3, and the arm 10 is structured such as to be movable in a peripheral direction within the notch portion 3a of the flow passage spacer 3. The bill-like projection portion 4 in accordance with the present embodiment can rotate within a range between 15 degrees and 75 degrees via the rotational shaft 7 by an external drive mechanism (not shown). In this case, the external drive mechanism for moving the bill-like projection portion 4 is structured such as to commonly serve a drive mechanism for moving the guide vane 2, whereby it is not necessary to add another drive mechanism.

Figure 9:
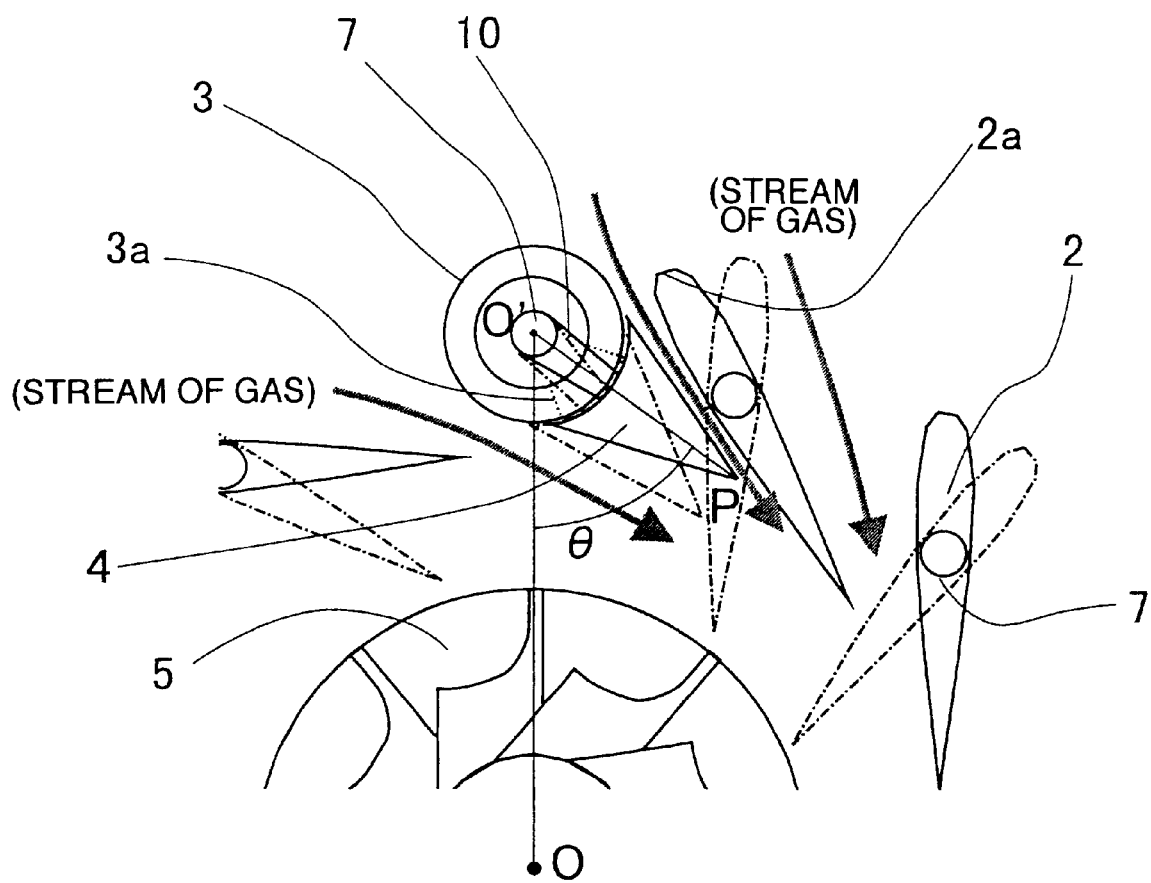
FIG. 9 is a view which shows a gas stream in a periphery of a flow passage spacer and a guide vane in the case of employing a movable bill-like projection portion.

The structure shown in FIG. 8 can change states from a state shown by a chain line to a state shown by a solid line in FIG. 9. In the state (shown by the solid line) that the leading edge 2a of the guide vane comes near the flow passage spacer 3, it is possible to move the edge point P of the bill-like projection portion 4 closer to the guide vane 2 than the state shown in FIG. 6. Accordingly, the stream between the flow passage spacer 3 and the guide vane 2 can be contracted due to the reduction of the flow passage area, and a speed increasing effect can be improved. As a result, the flow speed distribution in the peripheral direction at the inlet position of the turbine rotor 5 becomes more uniform and the average flow speed is increased, whereby a turbine efficiency can be improved. In the case that the leading edge 2a of the guide vane moves apart from the flow passage spacer 3 and is arranged as shown by the chain line, the bill-like projection portion 4 moves to a position shown by a chain line, so that the rotation of the guide vane 2 is not prevented. In this case, the bill-like projection 4, the rotational shaft 7 and the arm 10 may be integrally structured.

Figure 10:
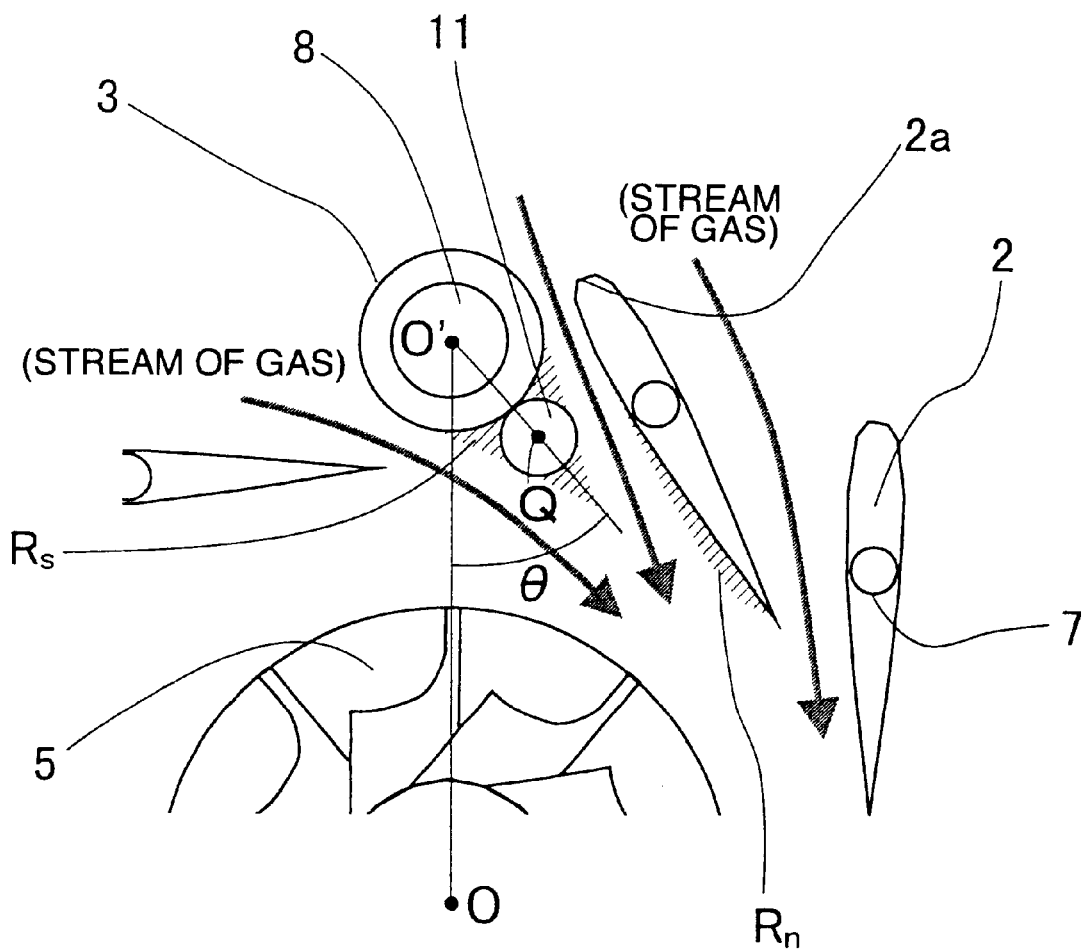
FIG. 10 is a view which shows a gas stream in a periphery of a flow passage spacer and a guide vane in accordance with a second embodiment of the present invention.

FIG. 10 shows a second embodiment of a turbine portion of a variable geometry turbocharger in accordance with the present invention. There is shown a state of a stream of a gas in the periphery of the flow passage spacer 3 and the guide vane 2. A structure of the present embodiment is substantially the same as the structure of the first embodiment, however, there is a difference in view that a rod-like member 11 having an outer diameter of about 4 mm is arranged in place of the bill-like projection portion 4. In this case, the rod-like member 11 is made of a material having the same coefficient of linear expansion as that of the guide vane 2 and is arranged adjacent to the turbine rotor 5 side at a predetermined angle θ=45 degrees. In this case, the angle θ is defined by a magnitude of an angle OO'Q using a center Q of the rod-like member 11.

Figure 11:
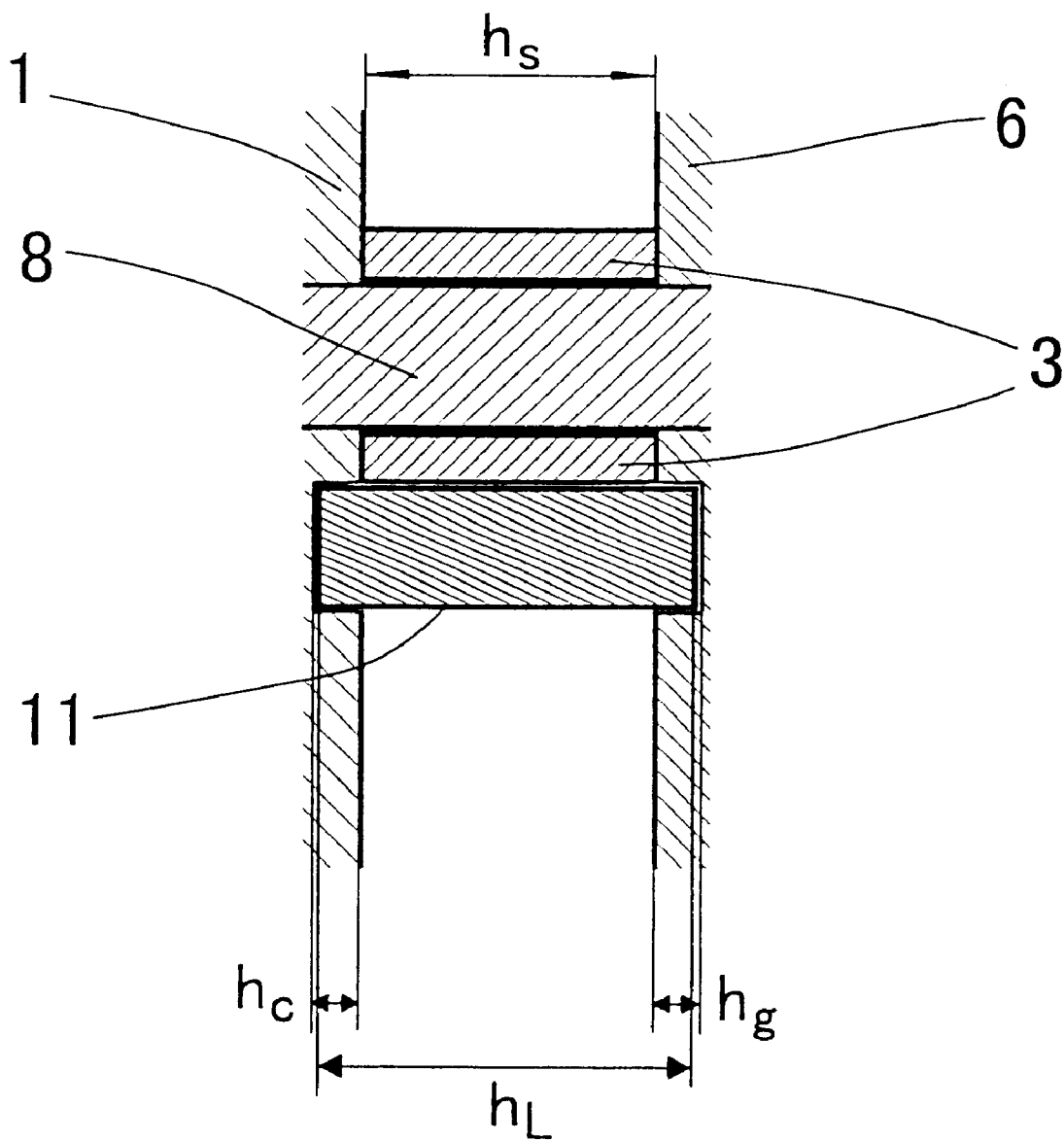
FIG. 11 is a cross sectional view of a flow passage spacer and a rod-like member in accordance with the second embodiment of the present invention.

FIG. 11 shows a cross sectional view of the flow passage spacer 3 and the rod-like member 11. Holes respectively having depths hc and hg are provided in the side walls of the casing 1 and the guide vane table 6, and both end portions of the rod-like member 11 are inserted into the respective holes. Further, a length hL of the rod-like member 11 is larger than the width hs of the flow passage spacer 3 and smaller than the width (hs+hc+hg). In this case, the rod-like member 11 may be fixed by utilizing any one of the side wall of the casing 1 and the side wall of the guide vane table 6. Further, the rod-like member 11 may be fixed by the screw or welding without providing the holes in the side walls of the casing 1 and the guide vane table 6.

It is possible to reduce the space of the separation area Rs generated at the back of the flow passage spacer 3 by the rod-like member 11, and it is possible to reduce the hydraulic energy loss due to the separation of the stream. Further, since the rod-like member 11 presses the stream between the flow passage spacer 3 and the guide vane 2 to the guide vane 2 in the state that the leading edge 2a of the guide vane comes near the flow passage spacer 3, the width of the separating area Rn inside the guide vane 2 becomes smaller than the case that the rod-like member 11 is not used. Accordingly, it is possible to reduce the hydraulic energy loss due to the separation of the stream.

Further, since the separation area is reduced, the length of the wake from the flow passage spacer 3 or the guide vane 2 can be shortened. As a result, the flow speed distribution in the peripheral direction at the inlet position of the turbine rotor 5 becomes more uniform in comparison with the conventional one, so that the loss in the turbine rotor 5 is reduced. Further, an average flow speed in the peripheral direction at the inlet position of the turbine rotor 5 is increased, whereby an amount of work performed by the stream of the gas in the turbine rotor 5 is increased. Therefore, in accordance with the present embodiment, a higher turbine efficiency than the conventional case can be realized by employing the rod-like member 11.

Figure 12:
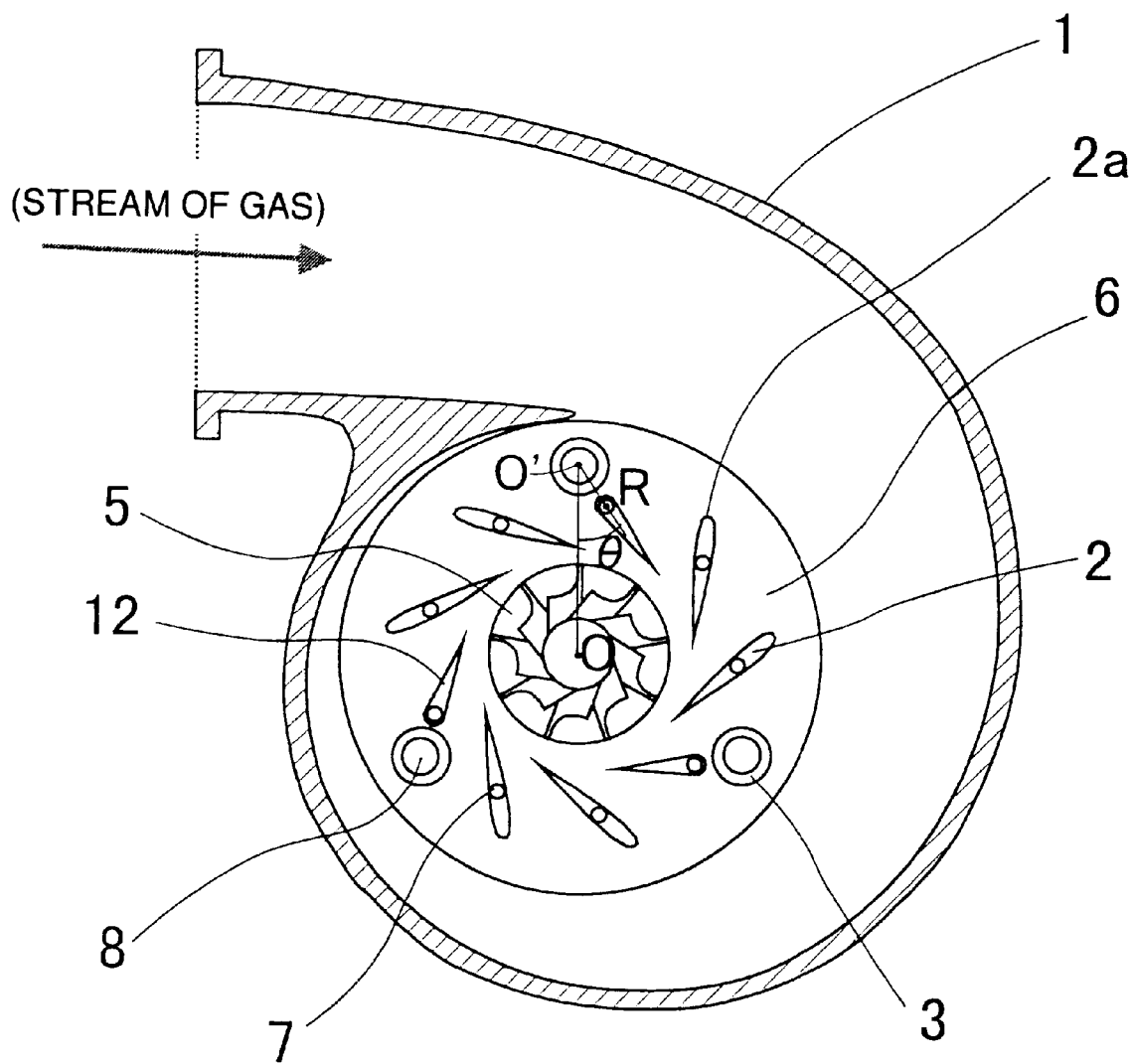
FIG. 12 is a cross sectional view of a turbine portion of a variable geometry turbocharger in accordance with a third embodiment of the present invention.

FIG. 12 shows a third embodiment of a turbine portion of a variable geometry turbocharger in accordance with the present invention. The bill-like projection portion 4 is arranged at the back of the flow passage spacer 3 in accordance with the first embodiment shown in FIG. 1, however, a guide vane 12 in which a leading edge side of the rotational shaft 7 is eliminated is arranged in accordance with the present embodiment. The rotational shaft 7 of the guide vane 12 is arranged so as to be adjacent to the turbine rotor 5 side at a predetermined angle θ=35 degrees. In this case, the angle θ is defined by a magnitude of an angle OO'R using a center R of the rotational shift 7 of the guide vane 12.

The guide vanes 2 and 12 are supported by the rotational shafts 7 extending outward the guide vane table 6 and are simultaneously rotated via the rotational shafts 7 by an external drive mechanism (not shown). A distance between an axial center of the rotational shafts 7 of the guide vanes 2 and 12 and the axial center O of the turbine rotor 5 is about 33 mm, and a distance between the center O' of the flow passage spacer 3 and the axial center of the turbine rotor 5 is about 42 mm. In accordance with the present invention, the guide vanes 2 and 12 are all arranged at an equal pitch by arranging the flow passage spacer 3 to an outer side and the rotational shafts 7 to an inner side in comparison with the first embodiment.

The guide vane 12 prevents the separation area from being generated at the back of the flow passage spacer 3. Further, the guide vane 12 presses the stream between the flow passage spacer 3 and the guide vane 2 to the guide vane 2 side even in the state that the leading edge 2a of the guide vane comes near the flow passage spacer 3, the separation area is not generated inside the guide vane 2. Accordingly, it is possible to reduce the fluid energy loss generated by the separation of the stream.

Since the separation area is not generated, the length of the wake from the flow passage spacer 3 or the guide vane 2 can be shortened. Further, in the same way as that of the movable bill-like projection portion 4 shown in FIG. 9, a speed increasing effect can be improved, since the stream can be contracted by the reduction of the flow passage area between the flow passage spacer 3 and the guide vane 2. Further, in accordance with the present invention, the guide vanes 2 and 12 are arranged to the inner side in comparison with the first embodiment. Accordingly, between the guide vanes 2 and 12 and the inlet of the turbine rotor 5, it is possible to reduce a damping of the flow speed due to a friction on the side walls of the casing 1 and the guide vane table 6A. Further, in accordance with the present embodiment, since all of the guide vanes 2 and 12 are arranged at an equal pitch, a difference of the stream between the guide vanes is small. As mentioned above, at the inlet position of the turbine rotor 5, a high average flow speed and a uniform distribution in a peripheral direction can be obtained, whereby a turbine efficiency can be improved.

Figure 13A:
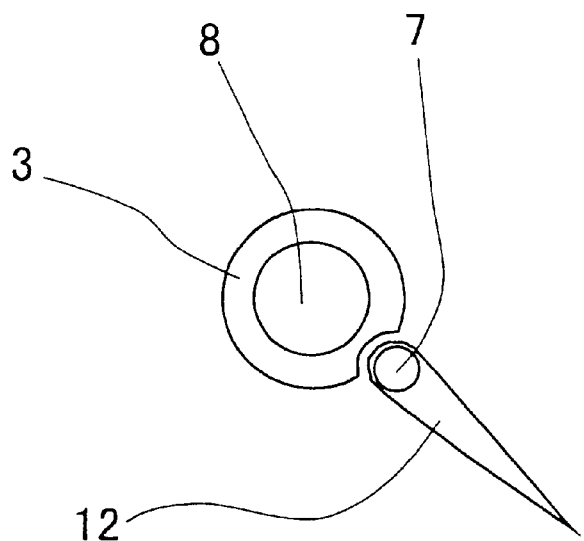
FIGS. 13A to 13C are views which show a flow passage spacer shape in the case of changing an arrangement of a flow passage spacer and a guide vane, in the third embodiment of the present invention.
Figure 13B:
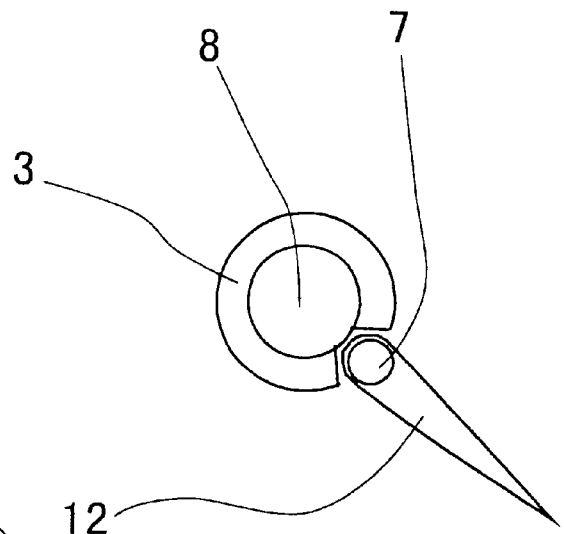
Figure 13C:
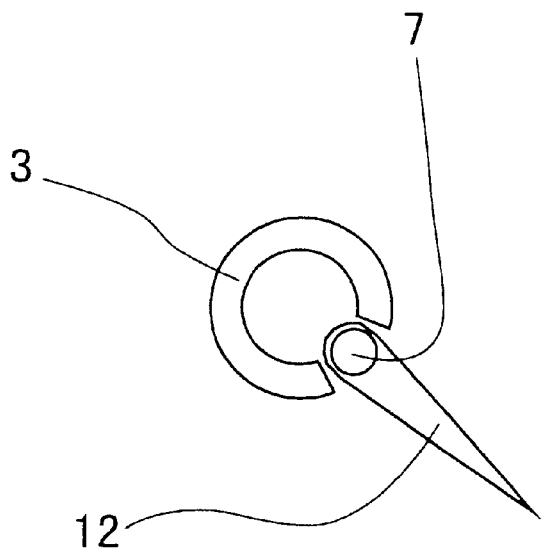

The gap between the flow passage spacer 3 and the guide vane 12 generates a turbulence of the stream and generates a hydraulic energy loss. Accordingly, the guide vane 12 is preferably arranged close to the flow passage spacer 3. In FIG. 13A, a recess is provided in a part of the outer periphery of the flow passage spacer 3 and in FIG. 13B, a part of the outer periphery of the flow passage spacer 3 is notched out, whereby the guide vane 12 is arranged closer than the case shown in FIG. 12. Further, in FIG. 13C, the flow passage spacer 3 having a part of the outer periphery being notched out is fixed to the casing 1 and the guide vane table 6 by welding or the like without using the bolts 8, whereby the guide vane 12 is arranged close to the flow passage spacer 3.

Figure 14:
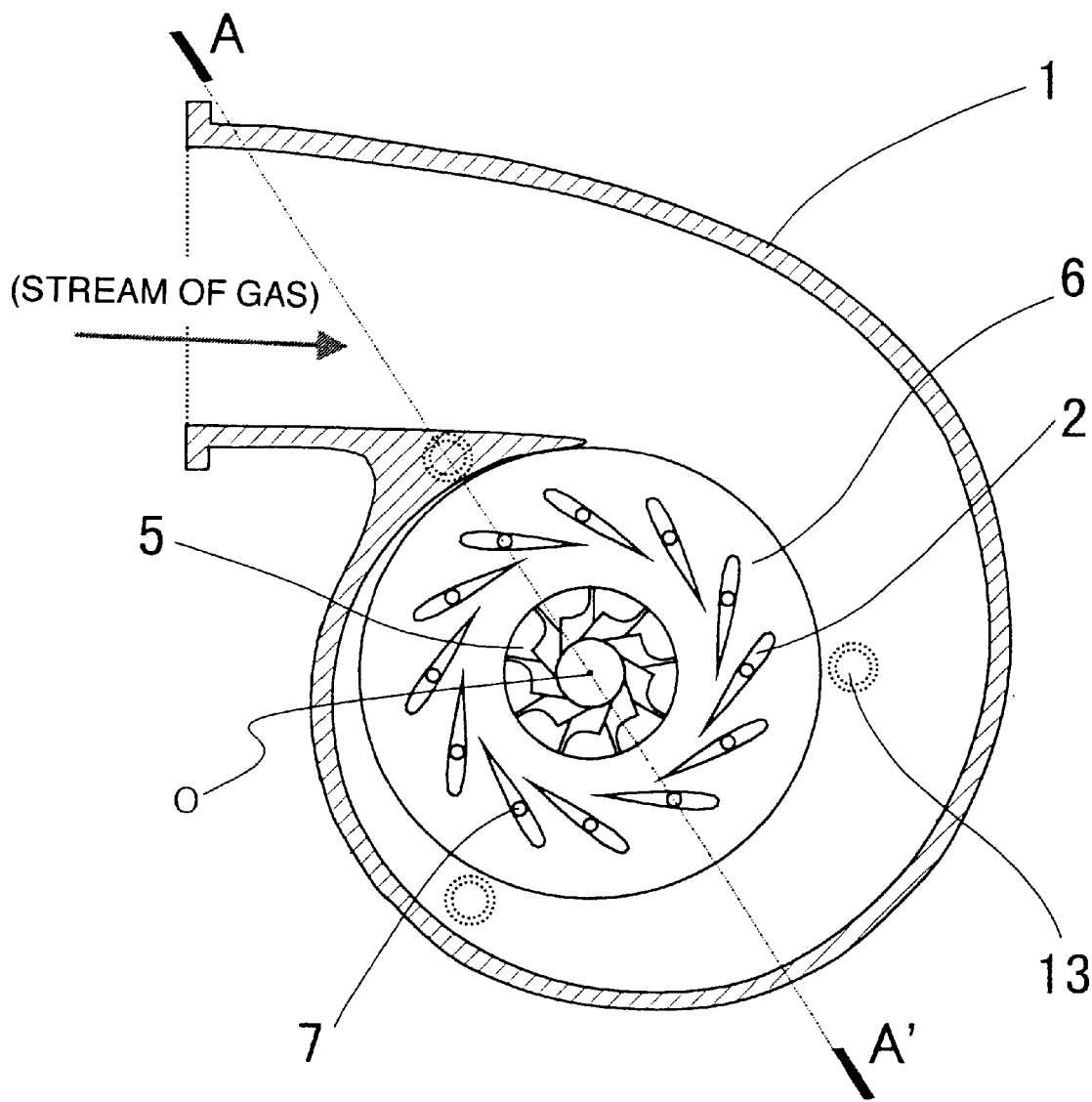
FIG. 14 is a cross sectional view of a turbine portion of a variable geometry turbocharger in accordance with a fourth embodiment of the present invention.

FIG. 14 is a fourth embodiment of a turbine portion of a variable geometry turbocharger in accordance with the present invention. In the first embodiment shown in FIG. 1, in order to prevent a stick of the guide vanes (that is, the guide vanes do not move) due to the thermal deformation of the side wall of the casing 1 and the side wall of the guide vane table 6 sectioning the turbine chamber, the flow passage spacer 3 for keeping the gap between both of the side walls and the guide vanes 2 minimum is employed. However, in accordance with the present embodiment, the flow passage spacer 3 is not used and twelve guide vanes 2 are arranged at an equal pitch. A distance between the axial center of the rotational shaft 7 of each of the guide vanes 2 and the axial center O of the turbine rotor 5 is about 35 mm. Three bolts 13 each having an outer diameter of 5 mm are arranged at positions uniformly separated into three portions in a peripheral direction. Further, a distance between the center of the bolt 13 and the axial center O of the turbine rotor is about 58 mm.

Figure 15:
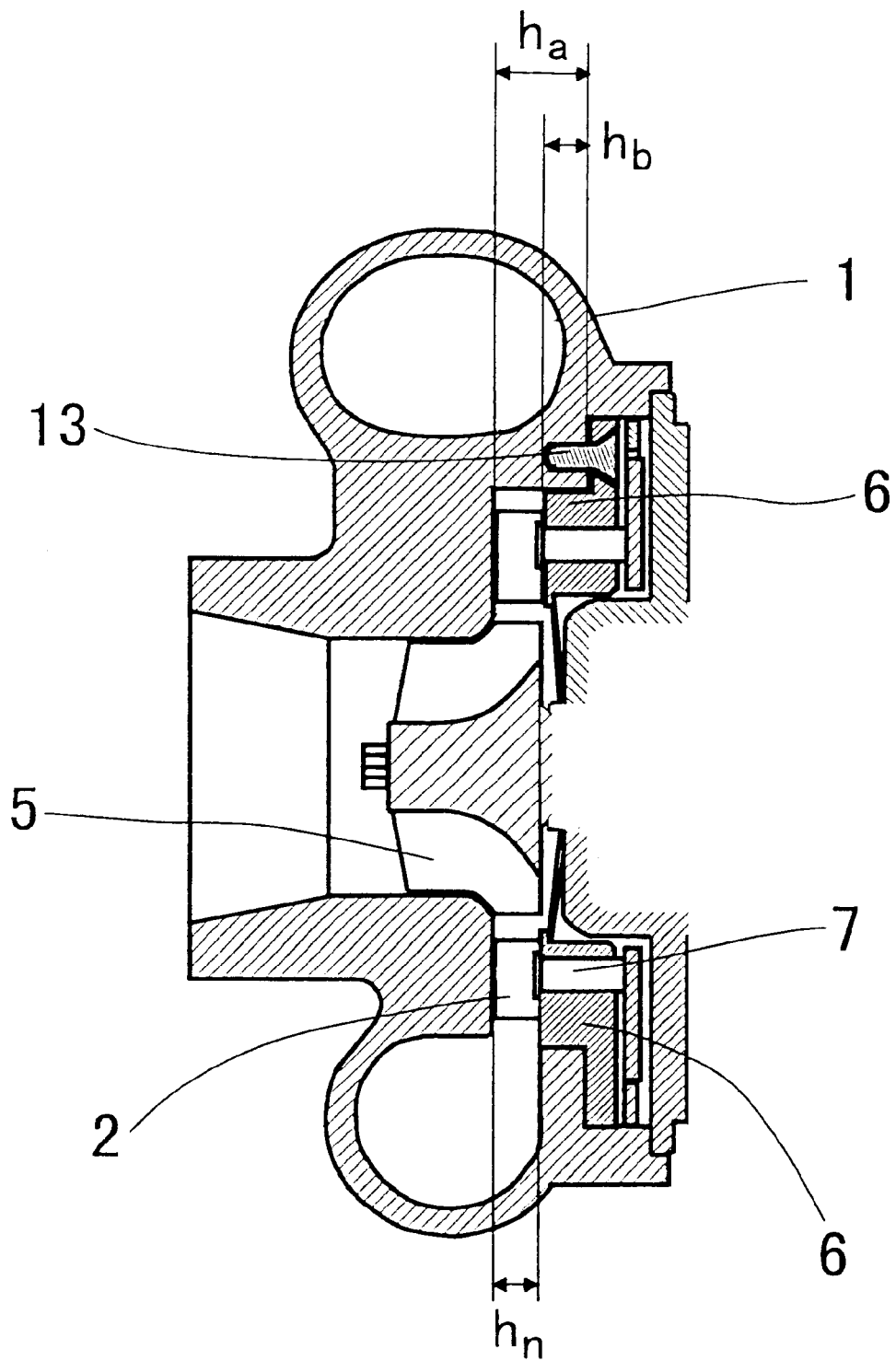
FIG. 15 is a cross sectional view taken along a line A–A' of the turbine portion in FIG. 14.

FIG. 15 shows a cross section taken along a line A–A' in FIG. 14. A bolt 13 having an outer diameter of 5 mm extends through a portion of the guide vane table 6 that extended to the casing 1 side and fastens the guide vane table 6 to the casing 1. In conventional, a resist D5S (ATSM standard) is employed for a material of the casing 1, SUS304 (JIS standard) is employed for a material of the guide vane table 6, and SCH22 (JIS standard)) is employed for a material of the guide vane 2, however, the resist D5S and SUS304 have a larger coefficient of linear expansion than the SCH22 and are easily thermally deformed. In accordance with the present embodiment, in place of these materials, a heat resisting cast steel HK40 (ATSM standard) having a little amount of carbon is employed for a material of the casing 1, the guide vane table 6 and the guide vane 2. In HK40, a coefficient of linear expansion is 18.2×10−6 mm/° C. in a range between about 20 and 1000° C. which is smaller than the coefficient of linear expansion of the resist D5S 20.8×10−6 mm/° C. In this case, the HK40 is substantially the same material as the SCH 22. A distance between both of the side walls of the casing 1 and the guide vane table 6 is defined by ha–hb in FIG. 15, and is designed to be slightly larger than the width hn of the guide vane 2.

In the present embodiment, a heating resisting cast steel having a small thermal deformation is employed for a material of the casing 1 and the guide vane table 6. That is, since both of the side walls sectioning the turbine chamber are hardly thermally deformed, the structure is made such as to keep the gap with respect to the guide vane minimum. Since the flow passage spacer 3 is omitted, it is possible to prevent the separation of the gas generated by the flow passage spacer 3, and it is possible to prevent the stream between the guide vanes 2 from being uneven by arranging the guide vanes at a uniform interval. Accordingly, a high turbine efficiency can be obtained by reducing the fluid energy loss and realizing a high average flow speed at the inlet position of the turbine rotor 5 and a uniform flow speed distribution in the peripheral direction. Further, since the heat resisting cast steel contains a reduced amount of carbon, an oxidation resistance is improved and a deterioration of the material is suppressed.

In this case, in the present embodiment, the HK40 is employed as the heat resisting cast steel, however, the material is not limited to this, a material having a smaller coefficient of linear expansion than the HK40 may be employed for the material of each of the casing 1, the guide vane table 6 and the guide vane 2. Further, the number and the mounting position in the peripheral direction of the bolts 13 for fixing the guide vane table 6 to the casing 1 are not limited to those shown in the embodiments.

In the embodiments mentioned above, the straight vane member is employed for the guide vanes 2 and 12, however, the present invention can be similarly applied to a variable geometry turbocharger employing a curved vane member. Further, the shape and the size of the bill-like projection portion 4 or the rod-like member 11 are not limited to those shown in the embodiments.

INDUSTRIAL APPLICABILITY

A variable geometry turbocharger in accordance with the present invention is suitable for being used as an apparatus in an energy converting system of an automobile, a ship, an airplane, a power generator and the like.

What is claimed is:

1. A variable geometry turbocharger comprising:
   rotatable guide vanes arranged within a turbine chamber as to surround a turbine rotor; and
   flow passage spacers for keeping a gap between both side walls of a casing and a guide vane table sectioning the turbine chamber and the guide vanes,
   wherein a bill-like projection portion is arranged in a part of an outer periphery of said flow passage spacer, and a front end of said projection portion is protruded to said turbine rotor side at a predetermined angle θ with respect to a line connecting a center of said flow passage spacer and a center of said turbine rotor.

2. A variable geometry turbocharger as claimed in claim 1, wherein said predetermined angle θ is within a range between 15 degrees and 75 degrees.

3. A variable geometry turbocharger as claimed in claim 1, wherein said projection portion is capable of rotating within a range between 15 degrees and 75 degrees.

4. A variable geometry turbocharger comprising:
   rotatable guide vanes arranged within a turbine chamber as to surround a turbine rotor; and
   flow passage spacers for keeping a gap between both side walls of a casing and a guide vane table sectioning the turbine chamber and the guide vanes,
   wherein a rod-like member is arranged on an outer periphery of said flow passage spacer and adjacent to said turbine rotor side at a predetermined angle θ with respect to a line connecting a center of said flow passage spacer and a center of said turbine rotor.

5. A variable geometry turbocharger as claimed in claim 4, wherein said predetermined angle θ is within a range between 15 degrees and 75 degrees.

6. A variable geometry turbocharger comprising:
   rotatable guide vanes arranged within a turbine chamber as to surround a turbine rotor; and
   flow passage spacers for keeping a gap between both side walls of a casing and a guide vane table sectioning the turbine chamber and the guide vanes,
   wherein a guide vane having a leading edge side with respect to a rotational shaft being eliminated is arranged adjacent to said turbine rotor side in an outer periphery of the flow passage spacer, and is arranged so that a line connecting a center of said turbine rotor and a center of said flow passage spacer and a line connecting a center of said rotational shaft and said flow passage spacer make a predetermined angle θ.

7. A variable geometry turbocharger as claimed in claim 6, wherein the rotational shaft of said guide vane in which the leading edge side of said rotational shaft is eliminated is arranged in said turbine rotor side so that said predetermined angle θ is within a range between 15 degrees and 75 degrees.

8. A variable geometry turbocharger comprising:
   rotatable guide vanes arranged within a turbine chamber as to surround a turbine rotor,
   wherein a carbon-containing heat resisting cast steel is used for a material of a casing and a guide vane table sectioning said turbine chamber and the guide vanes, and a gap between the guide vane and the casing is minimized by both side walls of the casing and the guide vane table sectioning the turbine chamber.

9. A variable geometry turbocharger as claimed in claim 8, wherein the carbon-containing heat resisting cast steel used for a material of the guide vane table has less carbon than SUS304 in JIS standard.

10. A variable geometry turbocharger as claimed in claim 8, wherein the carbon-containing heat resisting cast steel used for a material of the guide vane table has a smaller thermal expansion than resist D5S in ATSM standard.

11. A variable geometry turbocharger as claimed in claim 8, wherein a material having smaller coefficient of thermal expansion than 20.8×10−6 mm/° C. (at 20° C.–1000° C.) is employed for a material of said guide vane table.

12. A variable geometry turbocharger as claimed in claim 8, wherein SCH22 in JIS standard (HK40 in ATSM standard) is employed for a material of said guide vane table.

13. A variable geometry turbocharger as claimed in claim 8, wherein the carbon-containing heat resisting cast steel used for a material of the guide vane table has less carbon than resist D5S in ATSM standard.

14. A variable geometry turbocharger as claimed in claim 8, wherein the carbon-containing heat resisting cast steel used for a material of the guide vane table has a smaller thermal expansion than resist D5S in ATSM standard.

15. A variable geometry turbocharger as claimed in claim 8, wherein a material having smaller coefficient of thermal expansion than 20.8×10−6 mm/° C. (at 20° C.–1000° C.) is employed for a material of said casing.

16. A variable geometry turbocharger as claimed in claim 8, wherein SCH22 in JIS standard (HK40 in ATSM standard) is employed for a material of said casing.

17. A variable geometry turbocharger as claimed in claim 8, wherein SCH22 in JIS standard (HK40 in ATSM standard) is employed for a material of said guide vane table and said casing.

18. A variable geometry turbocharger as claimed in claim 8, wherein SCH22 in JIS standard (HK40 in ATSM standard) is employed for a material of said guide vane table, said casing and said vane.

* * * * *